United States Patent
Ramasamy et al.

(10) Patent No.: US 10,479,918 B2
(45) Date of Patent: Nov. 19, 2019

(54) TWO-COMPONENT LOST CIRCULATION PILL FOR SEEPAGE TO MODERATE LOSS CONTROL

(71) Applicant: Saudi Arabian Oil Company, Dhahran (SA)

(72) Inventors: Jothibasu Ramasamy, Dhahran (SA); Md Amanullah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 220 days.

(21) Appl. No.: 15/440,474

(22) Filed: Feb. 23, 2017

(65) Prior Publication Data

US 2018/0010030 A1    Jan. 11, 2018

Related U.S. Application Data

(60) Provisional application No. 62/358,721, filed on Jul. 6, 2016.

(51) Int. Cl.

| | | |
|---|---|---|
| *C09K 8/035* | (2006.01) | |
| *E21B 21/00* | (2006.01) | |
| *C09K 8/504* | (2006.01) | |
| *C09K 8/508* | (2006.01) | |
| *C09K 8/516* | (2006.01) | |

(52) U.S. Cl.
CPC .............. *C09K 8/035* (2013.01); *C09K 8/508* (2013.01); *C09K 8/5045* (2013.01); *C09K 8/516* (2013.01); *E21B 21/003* (2013.01); *C09K 2208/08* (2013.01)

(58) Field of Classification Search
None
See application file for complete search history.

(56) References Cited

U.S. PATENT DOCUMENTS

| | | |
|---|---|---|
| 4,579,668 A | 4/1986 | Messenger |
| 5,086,841 A | 2/1992 | Reid et al. |
| 6,902,002 B1 | 6/2005 | Chatterji et al. |
| 6,983,799 B2 | 1/2006 | Reddy et al. |

(Continued)

FOREIGN PATENT DOCUMENTS

| | | |
|---|---|---|
| KR | 100883644 B1 | 2/2009 |
| WO | 2014035810 A1 | 3/2014 |

(Continued)

OTHER PUBLICATIONS

International Search Report and Written Opinion for International Application No. PCT/US2017/040162; dated Sep. 15, 2017; pp. 1-12.

*Primary Examiner* — John J Figueroa
(74) *Attorney, Agent, or Firm* — Bracewell LLP; Constance G. Rhebergen; Brian H. Tompkins

(57) ABSTRACT

A two-component lost circulation material (LCM) is provided having a polymer component and a sodium hydroxide component. The polymer component may include a carrier fluid such as water, a particulate material such as fly ash, a fibrous material such as polypropylene fibers, and an acrylic polymer. The sodium hydroxide component may include water and sodium hydroxide. The sodium hydroxide component is introduced to contact the polymer component to form the two-component LCM. Methods of lost circulation control and manufacture of a two-component LCM are also provided.

13 Claims, 4 Drawing Sheets

(56) References Cited

U.S. PATENT DOCUMENTS

| | | |
|---|---|---|
| 7,229,492 B2 | 6/2007 | Chatterji et al. |
| 7,799,743 B2 | 9/2010 | Way et al. |
| 7,866,394 B2 | 1/2011 | Creel et al. |
| 8,271,246 B2 | 9/2012 | Leonard et al. |
| 8,383,556 B1 | 2/2013 | Kaiser et al. |
| 8,383,558 B2 | 2/2013 | Raghava et al. |
| 8,828,913 B1 | 9/2014 | Kaiser et al. |
| 9,453,156 B2 | 9/2016 | Wu |
| 2010/0243657 A1 | 9/2010 | Johnson et al. |
| 2012/0247768 A1 | 10/2012 | Ballard |
| 2012/0316089 A1* | 12/2012 | Kulkarni .................. C09K 8/04 507/112 |
| 2014/0353043 A1 | 12/2014 | Amanullah et al. |
| 2015/0027710 A1 | 1/2015 | Miller |
| 2016/0053160 A1* | 2/2016 | Nguyen .................. C09K 8/68 166/308.5 |
| 2016/0257869 A1 | 9/2016 | Kulkarni et al. |
| 2018/0171201 A1* | 6/2018 | Ramasamy .......... C09K 8/5083 |

FOREIGN PATENT DOCUMENTS

| | | |
|---|---|---|
| WO | 2015026713 A1 | 2/2015 |
| WO | 2015108501 A1 | 7/2015 |

* cited by examiner

TWO-COMPONENT LOST CIRCULATION PILL FOR SEEPAGE TO MODERATE LOSS CONTROL

CROSS-REFERENCE TO RELATED APPLICATIONS

This application claims priority from U.S. Provisional Application No. 62/358,721 filed Jul. 6, 2016, and titled "A TWO-COMPONENT LOST CIRCULATION PILL FOR SEEPAGE TO MODERATE LOSS CONTROL." For purposes of United States patent practice, this application incorporates the contents of the Provisional Application by reference in its entirety.

BACKGROUND

Field of the Disclosure

The present disclosure generally relates to controlling lost circulation in a wellbore during drilling with a drilling fluid. More specifically, embodiments of the disclosure relate to a lost circulation material (LCM).

Description of the Related Art

Lost circulation is one of the frequent challenges encountered during drilling operations. Lost circulation can be encountered during any stage of operations and occurs when drilling fluid (or drilling mud) pumped into a well returns partially or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. In extreme cases, lost circulation problems may force abandonment of a well.

Lost circulation can occur in various formations, such as naturally fractured formations, cavernous formations, and high permeable formations. Lost circulation can be categorized by the amount of fluid or mud lost as seepage type, moderate type, severe type, and total loss. The extent of the fluid loss and the ability to control the lost circulation with an LCM depends on the type of formation in which the lost circulation occurs. Seepage type and moderate type lost circulation may occur in high permeable formations, extremely high permeable formations ("referred to as "super-K" formations), and fissured and fractured formations. In addition to the natural causes of lost circulation, subsurface formations having a narrow mud weight window, such as weak and unconsolidated formations, depleted formations, and high pressure zone formations, may also cause moderate type to severe type lost circulation due to the creation of induced fractures in the near wellbore formation. Such lost circulation may occur when the mud weight used for well control and borehole stability exceeds the fracture gradient of the formation.

SUMMARY

Lost circulation materials (LCMs) are used to mitigate the lost circulation by blocking the path of the drilling mud into the formation. The type of LCM used in a lost circulation situation depends on the extent of lost circulation and the type of formation. Lost circulation materials may be classified into different categories, such as fibrous materials, flaky materials, granular materials, gel type materials, cross-linking polymers, and loss control slurries. Such materials are frequently used either alone or in combination to control loss of circulation. The costs incurred in lost circulation situations may be due to lost time, losses of drilling fluids, and losses of production. Existing LCMs may perform poorly in mitigation and prevention of moderate lost circulation and seepage type lost circulation, and may not be suitable for controlling several loss of circulation.

In some embodiments, a lost circulation material (LCM) composition is provided. The LCM composition includes a first component having a carrier fluid, a particulate material, a fibrous material, and an acrylic polymer, and a second component having sodium hydroxide. In some embodiments, the carrier fluid of the first component is water. In some embodiments, the particulate material of the first component is fly ash. In some embodiments, the fibrous material of the first component is polypropylene. In some embodiments, the LCM composition consists of the first component and the second component. In some embodiments, the first component consists of the carrier fluid, the particulate material, the fibrous material, and the acrylic polymer. In some embodiments, the carrier fluid consists of water, the particulate material consists of fly ash, and the fibrous material consists of polypropylene. In some embodiments, the second component includes water. In some embodiments, the second component consists of sodium hydroxide and water and, in some embodiments, the second component includes 25% by weight of the sodium hydroxide. In some embodiment, the fly ash of the first component is an amount in the range of 200 grams to 400 grams. In some embodiments, the polypropylene of the first component is an amount in the range of 2 grams to 6 grams. In some embodiments, the acrylic polymer is an acrylic polymer solution that includes water and at least 30% by weight acrylic polymer. In some embodiments, the acrylic polymer solution of the first component is an amount in the range of 20 milliliters to 40 milliliters. In some embodiments, the LCM has a gel stiffness modulus (GSM) of at least 15.881 pounds-force/millimeter (lbf/mm). In some embodiments, the LCM has a yield strength of at least 74 pounds-force (lbf).

Additionally, in some embodiments, a method to control lost circulation in a lost circulation zone in a wellbore is provided. The method includes introducing a first component into the wellbore such that the first component contacts the lost circulation zone. The first component includes a carrier fluid, a particulate material, a fibrous material, and an acrylic polymer. The method also includes introducing a second component into the wellbore, such that the second component contacts first component in the lost circulation zone and the second component includes sodium hydroxide. In some embodiments, introducing the first component into the wellbore such that the first component contacts the lost circulation zone includes introducing an altered drilling fluid having the first component into the wellbore, such that the altered drilling fluid contacts the lost circulation zone. In some embodiments, introducing a second component into the wellbore such that the second component contacts first component in the lost circulation zone includes inserted coiled tubing into the wellbore and introducing the second component via coiled tubing via the wellbore. In some embodiments, introducing the second component into the wellbore such that the second component contacts the first component in the lost circulation zone includes forming a lost circulation material (LCM) from a reaction of the first component with the second component. In some embodiments, the carrier fluid of the first component is water. In some embodiments, the particulate material of the first component is fly ash. In some embodiments, the fibrous material of the first component is polypropylene. In some embodiments, the LCM composition consists of the first component and the second component. In some embodiments, the first component consists of the carrier fluid, the particulate material, the fibrous material, and the acrylic polymer. In some embodiments, the carrier fluid consists of water, the particulate material consists of fly ash, and the fibrous material consists of polypropylene. In some embodiments, the second component includes water. In some embodiments, the second component consists of sodium hydroxide and water and, in some embodiments; the second component includes 25% by weight of the sodium hydroxide. In some embodiment, the fly ash of the first component is an amount in the range of 200 grams to 400 grams. In some embodiments, the polypropylene of the first component is an amount in the range of 2 grams to 6 grams. In some embodiments, the acrylic polymer is an acrylic polymer solution that includes water and at least 30% by weight acrylic polymer. In some embodiments, the acrylic polymer solution of the first component is an amount in the range of 20 milliliters to 40 milliliters. In some embodiments, the LCM has a gel stiffness modulus (GSM) of at least 15.881 pounds-force/millimeter (lbf/mm). In some embodiments, the LCM has a yield strength of at least 74 pounds-force (lbf).

In some embodiments, a method of forming a lost circulation material (LCM) is provided. The method includes adding a carrier fluid to form a first mixture and adding a particulate material to the first mixture. The particulate material includes fly ash. The method also includes adding a fibrous material to the first mixture, the fibrous material is polypropylene and adding an acrylic polymer solution to the first mixture. The method further includes adding water to form a second mixture and adding sodium hydroxide to the second mixture, such that the LCM composition is formed by contacting the first mixture with the second mixture. In some embodiments, the carrier fluid includes water. In some embodiments, the second component includes 25% by weight of the sodium hydroxide. In some embodiments, the fly ash is at least 55% by weight of the LCM composition. In some embodiments, the polypropylene is at least 0.7% by weight of the LCM composition. In some embodiments, the acrylic polymer is an acrylic polymer solution that includes water and at least 30% by weight acrylic polymer. In some embodiments, the acrylic polymer solution is at least 7.7% by weight of the LCM composition. In some embodiments, the LCM has a gel stiffness modulus (GSM) of at least 15.881 pounds-force/millimeter (lbf/mm). In some embodiments, the LCM has a yield strength of at least 74 pounds-force (lbf).

DETAILED DESCRIPTION

Figure 1:
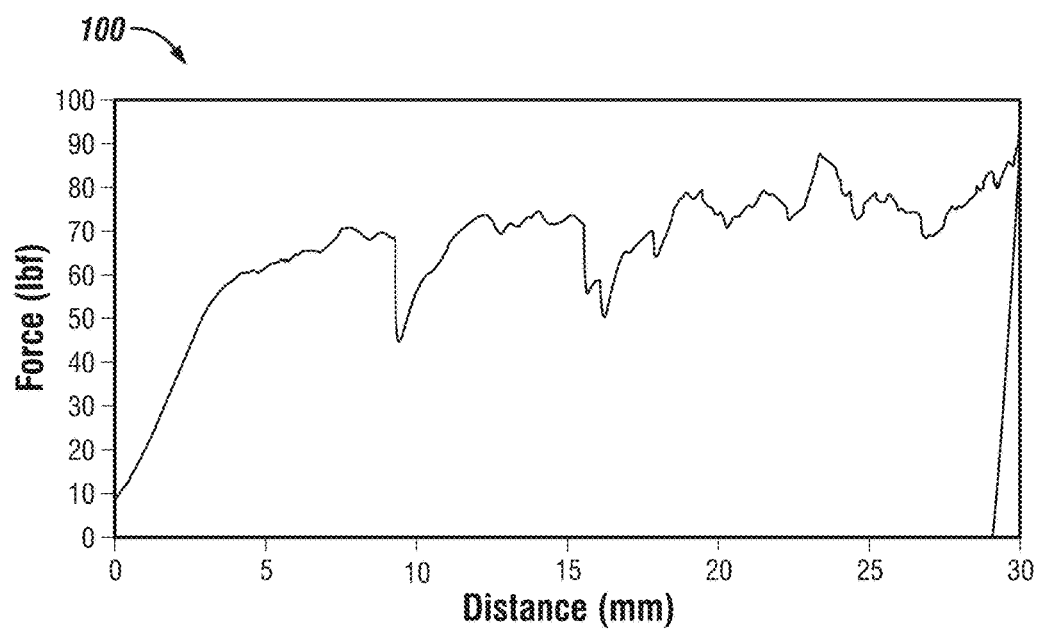
FIG. 1 is a plot of displacement versus compression force for a compression test using a 3 millimeter perforated Teflon™ disc in accordance with an example embodiment of the disclosure.

The present disclosure will now be described more fully with reference to the accompanying drawings, which illustrate embodiments of the disclosure. This disclosure may, however, be embodied in many different forms and should not be construed as limited to the illustrated embodiments set forth in the disclosure. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the volume of the drilling fluid that returns to the surface is less than the volume of the drilling fluid pumped into the wellbore, and it is this reduction or absence of returning drilling fluid that is referred to as lost circulation.

Embodiments of the disclosure include a two-component LCM to mitigate or prevent lost circulation in a well, as well as to provide seepage control and minimize or prevent fluid loss. The two-component LCM includes a polymer component and a sodium hydroxide (also referred to as "caustic soda") component, such that the polymer component is first placed downhole, followed by placement of the sodium hydroxide component downhole to contact and react with the polymer component and form the two-component LCM. In some embodiments, the polymer component includes a carrier fluid, a particulate material, a fibrous material, and an acrylic polymer. In some embodiments, the polymer component includes water as the carrier fluid, fly ash as the particulate material, polypropylene as the fibrous material, and the acrylic polymer. In some embodiments, the polymer component of the two-component LCM includes fly ash in the range of about 200 grams (g) to 400 g, polypropylene fibers in the range of about 2 g to about 6 g, and a 30% acrylic polymer solution in the range of about 20 milliliters (ml) to 40 ml. In some embodiments, the sodium hydroxide component includes water and sodium hydroxide. In some embodiments, the sodium hydroxide component may include at least 20% by weight sodium hydroxide of the total weight of the sodium hydroxide component.

In some embodiments, the polymer includes an acrylic polymer solution. In some embodiments, the acrylic polymer solution is a 30% acrylic polymer solution, such as XUR 201300673-39-B obtained from Dow Chemical of Midland, Mich., USA. In some embodiments, the acrylic polymer solution may include sodium polycarboxylate in the range of about 29% to about 31% and water in the range of about 69% to about 71%. In some embodiments, the two-component LCM may also include fly ash as a particulate material and polypropylene as a fibrous material. The fly ash may be obtained from coal combustion and may include silicon dioxide, aluminum oxide, and calcium oxide. In some embodiments, the fly ash is obtained from Ashtech International (FZE) of Dubai, United Arab Emirates. The polypropylene may be a polypropylene homopolymer. In some embodiments, the polypropylene fibers may have a melting point of greater than 165° C. and a specific gravity of 0.91 kilograms/liter (kg/L). In some embodiments, the polypropylene fibers are formed from isotactic polypropylene. In some embodiments, the polypropylene may be polypropylene fiber obtained from Belgian Fibers Manufacturing SA of Mouscron, Belgium.

As described in the disclosure, embodiments include methods of delivering the two-component LCM to a lost circulation zone, and methods of placement of the polymer component and sodium hydroxide component to form the two-component LCM from the reaction between the polymer component and the sodium hydroxide component. In some embodiments, the two-component LCM may be formed by introducing (for example, pumping) the polymer component downhole, such as in a fluid pill, followed by introducing (for example, pumping) the sodium hydroxide component downhole that that the sodium hydroxide component comes into contact with the polymer component and forms the two-component LCM. In some embodiments, the polymer component may be added directly to a drilling fluid, such as a drilling mud, to create an altered drilling fluid having the polymer component of the two-component LCM. After addition of the polymer component of the two-component LCM to a drilling fluid, the altered drilling fluid may be circulated at a pump rate effective to position the altered drilling fluid into contact with a lost circulation zone in a wellbore. In some embodiments, the sodium hydroxide component may be introduced to the polymer component downhole via coil tubing. As the sodium hydroxide component comes into contact with the polymer component, the two-component LCM forms and alters the lost circulation zone (for example, by entering and blocking porous and permeable paths, cracks, and fractures in a formation in the lost circulation zone, such as forming a plug in a fracture). The two-component LCM thus provides instant in-situ interaction and formation with an improved ease of delivery to a lost circulation zone, reducing non-productive time and fluid losses due to lost circulation.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting examples of a two-component LCM were prepared and evaluated against commercially available LCMs. A two-component LCM having a polymer component (referred to as "Component I") and a sodium hydroxide component (referred to as "Component II") were was prepared according to the techniques described in the disclosure. The composition of the two-component LCM is shown in Table 1, with the amount of each constituent expressed in milliliters (ml) or grams (g), and as the weight percentage of the total weight (w/w %).

TABLE 1

Composition of Component I and Component II of Example Two-Component LCM

|  | | w/w % |
|---|---|---|
| Component I | | |
| Water (ml) | 200 ml | 36.6 |
| Fly ash (g) | 300 g | 55 |
| Polypropylene (g) | 4 g | 0.7 |
| Acrylic polymer, 30% (ml) | 40 ml | 7.7 |
| Component II | | |
| Water (ml) | 6 ml | 80 |
| Caustic soda (g) | 1.5 g | 20 |

Component I and Component II of the two-component LCM were prepared separately. Component I of the two-component LCM was prepared by adding 300 g of fly ash to 200 ml of water in a mud cup and mixing in a mixer manufactured by Hamilton Beach Brands, Inc., of Glen Allen, Va., USA. 4 g of polypropylene fibers were added to the mixture during mixing, followed by the addition of 40 ml of 30% acrylic polymer to the mixture during mixing. The components in the mixture were mixed for a time period of about 5 minutes (min). Component II of the two-component LCM was prepared by adding 1.5 g of caustic soda to 6 ml of water and mixing for a time period to ensure sufficient mixing of the two ingredients.

After the separate preparation of Component I and Component II of the two-component LCM, Component I was placed in a test cell and Component II was added to the test cell with react with Component I. The in-situ reaction formed the example two-component LCM used in the test procedures described herein.

A compression test and a plugging efficiency test were performed on the two-component LCM, a first commercially available LCM, and a second commercially available LCM. The compression test was performed using a test cell and two perforated Teflon™ discs, with a first perforated Teflon™ disc having a hole size of 3 millimeter (mm) and a second perforated Teflon™ disc having a hole size of 5 mm. The perforated Teflon™ discs used during testing were connected to a computer that displayed the results of the compression test. The compression test was performed using a pre-test speed of 1.0 mm/sec, a test speed of 1.0 mm/sec, and a post-test speed of 10.0 mm/sec. The test speed of the compression test corresponds to a measure of the flat foot disc displacement that used to push the top of the samples resting the test cell. The compression test was used to determine the displacement and corresponding compression force applied to the LCM in the test cell.

The two-component LCM was tested by placing the prepared Component I inside the text cell, adding the separately prepared Component II to the test cell, and then mixing to form the two-component LCM. The first commercially available LCM was prepared using a commercially available water soluble acrylamide polymer ZND-2 Guangya Gel manufactured by Sichuan Guangya Polymer Chemical Co., Ltd. of Sichuan, China. The ZND-2 polymer has a composition of 90% acrylamide copolymer and 10% CaO, a pH of 7, a specific gravity of 1.302, and a flash point greater than 200° C. The second commercially available LCM was prepared using a commercially available water soluble acrylamide polymer ZND-6 Guangya Gel manufactured by Sichuan Guangya Polymer Chemical Co., Ltd. of Sichuan, China. The ZND-6 polymer has a composition of 100% acrylamide copolymer, a pH of 7, a specific gravity of 1.1, and a flash point greater than 200° C. The components of each commercially available LCM were mixed in the Hamilton Beach mixer for a time period of about 20 minutes and then cured for about a time period of about 2 hours in a closed container to allow for inter-particle bonding, networking, and gel stiffening.

FIG. 1 depicts the results of the compression test for the 3 mm perforated Teflon™ disc as a plot 100 of displacement (mm) versus compression force (pounds force (lbf)). As shown in FIG. 1, the Y-axis 102 corresponds to the displacement and the X-axis 104 corresponds to the compression force resulting from the compression test using the 3 mm perforated Teflon™ disc.

Figure 2:
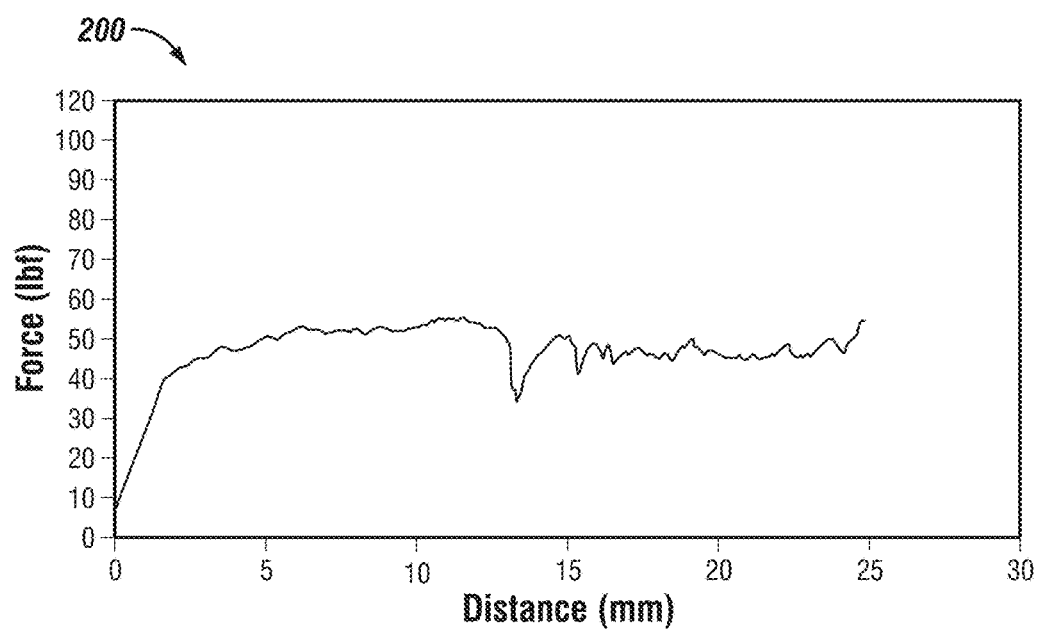
FIG. 2 is a plot of displacement versus compression force for a compression test using a 5 millimeter perforated Teflon™ disc in accordance with an example embodiment of the disclosure.

FIG. 2 depicts the results of the compression test for the 5 mm perforated Teflon™ disc as a plot 200 of displacement (mm) versus compression force (pounds (lbf)). As shown in FIG. 2, the Y-axis 202 corresponds to the displacement and the X-axis 204 corresponds to the compression force resulting from the compression test using the 5 mm perforated Teflon™ disc.

Figure 3:
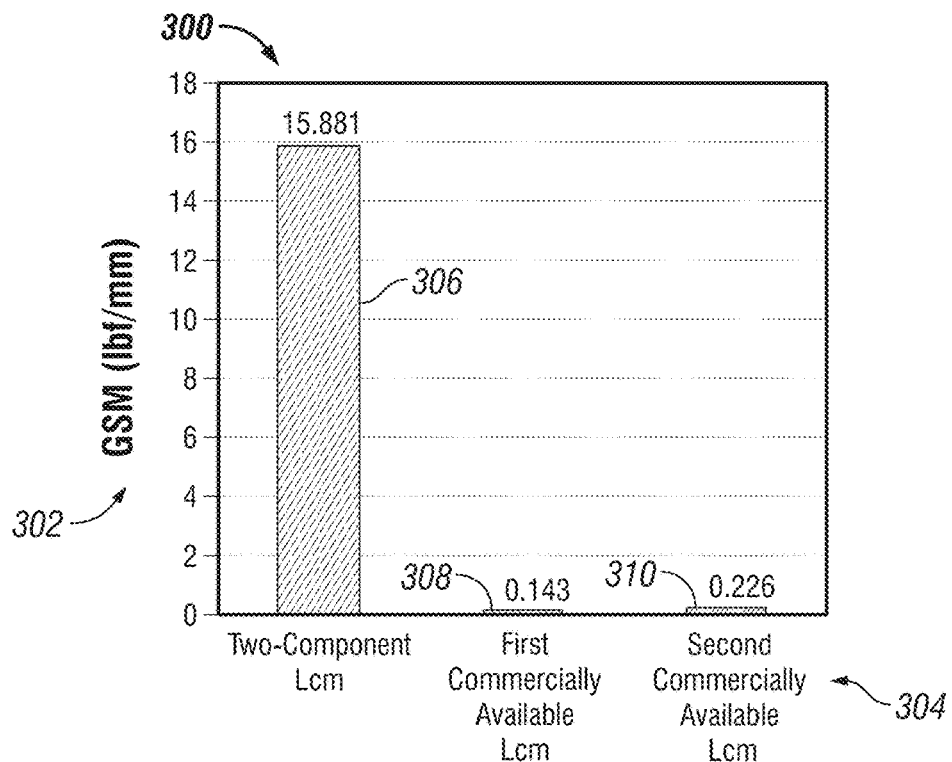
FIG. 3 is a bar graph of gel stiffness modulus for a date palm seed LCM as compared to commercially available LCMs in accordance with an example embodiment of the disclosure.

The results shown in FIGS. 1 and 2 and the results obtained from the compression test of the first commercially available LCM and the second commercially available LCM were used to determine the LCM characteristics of gel stiffness modulus (GSM) and yield strength (YS). FIG. 3 depicts a GSM bar graph 300 that illustrates the determined GSM for the two-component LCM as compared to the first commercially available LCM and the second commercially available LCM. As shown in FIG. 3, the Y-axis 302 corresponds to the GSM (in lbf/mm) and the X-axis 304 corresponds to two-component LCM, the first commercially available LCM and the second commercially available LCM.

As shown in FIG. 3, the determined GSM for the two-component LCM (bar 306) is 15.881 lbf/mm. In contrast, the determined GSM for the first commercially available LCM (bar 308) is 0.143 and for the second commercially available LCM (bar 310) is 0.226. Thus, the GSM of the example two-component LCM is about 70 times greater than the GSM of the commercially available LCMs. The greater two-component LCM offers greater resistance to flow than commercially available LCMs and provides an improved solution for moderate type and other types of lost circulation.

Figure 4:
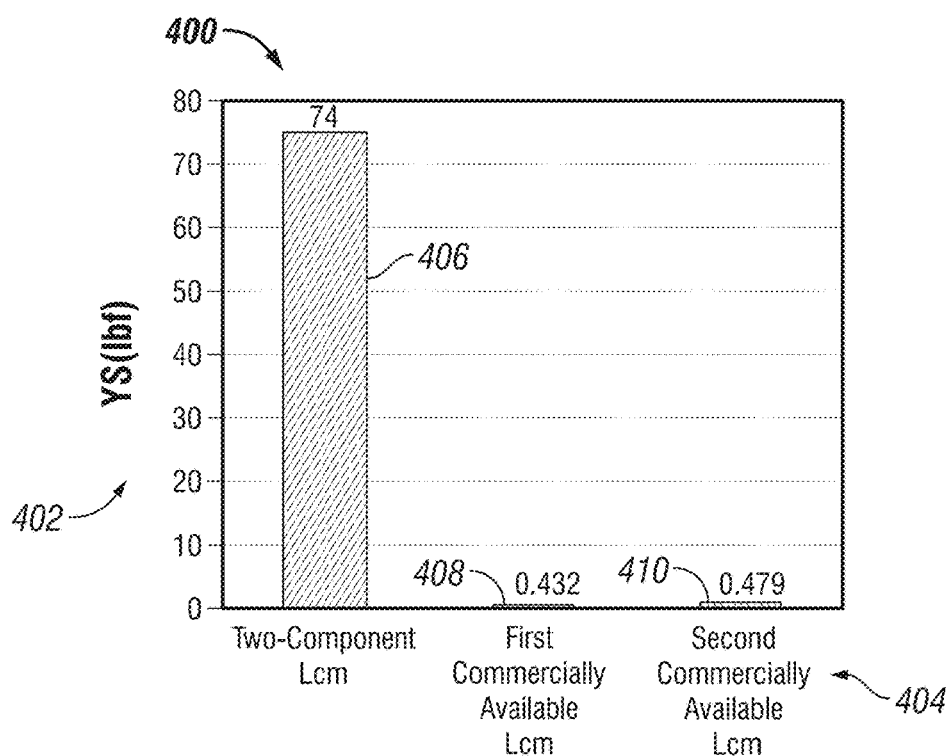
FIG. 4. is a bar graph of yield strength for a date palm seed LCM as compared to commercially available LCMs in accordance with an example embodiment of the disclosure.

FIG. 4 depicts a YS bar graph 400 that illustrates the determined YS for the two-component LCM as compared to the first commercially available LCM and the second commercially available LCM. As shown in FIG. 4, the Y-axis 402 corresponds to the YS (in lbf) and the X-axis 404 corresponds to two-component LCM, the first commercially available LCM and the second commercially available LCM.

As shown in FIG. 4, the determined YS for the two-component LCM (bar 406) is 74 lbf. In contrast, the determined GSM for the first commercially available LCM (bar 408) is 0.432 and for the second commercially available LCM (bar 410) is 0.479. Thus, the YS of the example two-component LCM is over 150 times greater than the YS of the commercially available LCMs. The greater YS of the two-component LCM further illustrates that the two-component LCM provides an improved solution for moderate type and other types of lost circulation.

Figure 5:
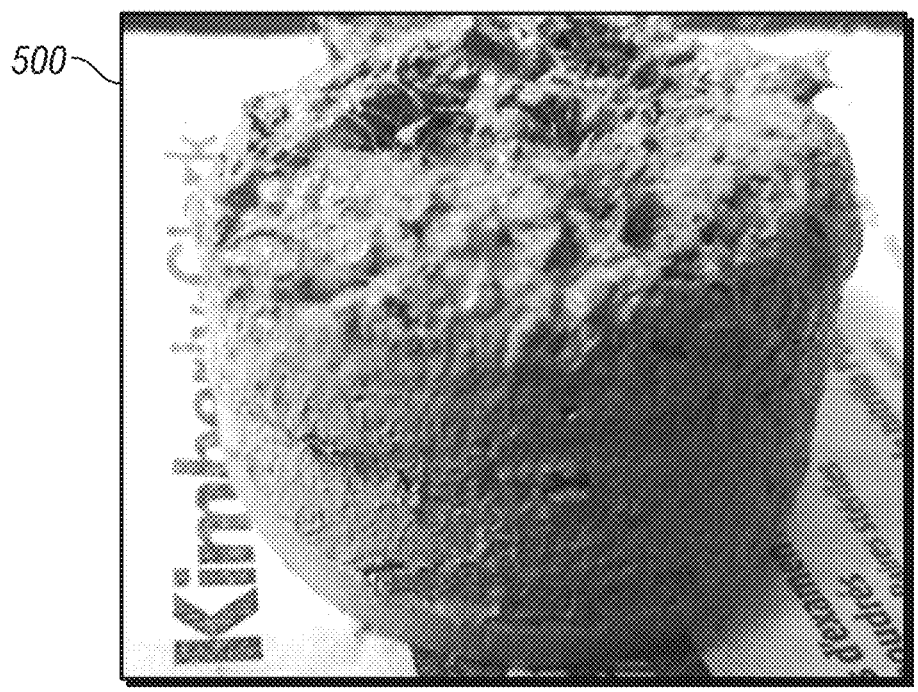
FIG. 5 is a photograph of a plug formed by a two-component LCM after a compression test in accordance with an example embodiment of the disclosure.

FIG. 5 is a photograph 500 of the plug formed by the two-component LCM after a compression test was performed on the two-component LCM in accordance with the techniques described in the disclosure. FIG. 5 illustrates the formation from the two-component LCM of a plug having the gel stiffness modulus and yield strength properties described supra. The strength of the resulting plug formed by the two-component LCM may be dependent on the pH of the two-component LCM. Thus, in some embodiments, the pH of a two-component LCM may be increased to form a plug having a greater strength.

The plugging efficiency test was performed using a 2 mm slotted metal disc and a Permeability Plugging Tester (also referred to as a "PPT" or "Pore Plugging Test" apparatus) manufactured by OFI Testing Equipment, Inc., of Houston, Tex., USA. The conventional cell of the Permeability Plugging Tester used in the plugging efficiency test may be operated up to 2,000 psi and 500° F. The 2 mm slotted metal disc was used as the filter medium of the Permeability Plugging Tester in the plugging efficiency test. A first plugging efficiency test was performed at conditions of room temperature and about 1500 psi differential pressure. A second plugging efficiency test was performed at conditions of about 250° F. and about 1500 psi differential pressure. The two-component LCM was tested by placing the prepared Component I inside the PPT cell, adding the separately prepared Component II to the PPT cell, and then mixing to form the two-component LCM.

The two-component LCM was tested using the Permeability Plugging Tester apparatus and the following plugging efficiency test procedure:

1. Set the temperature controller/thermostat to the testing temperature;
2. Check the condition of the O-rings in the groove at the top of the test cell of the Permeability Plugging Tester apparatus and in the cell end cap and replace the O-rings if needed;
3. Apply a thin coating of high temperature grease to all the O-rings, including the two O-rings on the piston of the Permeability Plugging Tester apparatus;
4. Screw the T-bar of the Permeability Plugging Tester apparatus into the piston, install into the bottom end of the test cell, position the piston about 1 inch into the cell bore, and remove the T-bar;
5. Add a volume of hydraulic oil to the test cell using the hydraulic hand pump of the Permeability Plugging Tester apparatus;
6. Install all the O-rings and secure the end cap of the cell in position such that oil flows from the hole in the end cap to ensure no air is trapped;
7. Install the valve stem into the bottom end cap of the cell, tighten the valve stem, and disconnect from the hydraulic hand pump of the Permeability Plugging Tester apparatus;
8. Place the cell upright on a suitable stand;
9. Placing the prepared Component I inside the test cell, add the separately prepared Component II to the test cell, and mix to form the two-component LCM;
10. Install an O-ring into the top of the cell below the 2 mm slotted disc;
11. Place the 2 mm slotted disc on top of the O-ring;
12. Insert the end cap on the top of the disc, screw down the threaded retaining ring, and fully tighten;
13. Tighten the top stem of the test cell;

14. Place the cell into the heating jacket of the Permeability Plugging Tester apparatus;

15. Connect a pressure hose from the hydraulic hand pump to the bottom of the test cell via a quick connector and ensure the bottom stem is closed;

16. Connect the back pressure hose/sample collector to the top stem of the test cell, ensuring that the locking pin is in place, close the pressure relief valve on the side of the hydraulic hand pump, apply the testing pressure via the back pressure regulator to the top of the test cell, and close the top valve.

17. Place a thermometer into the hole at the top of the test cell. wait until the testing temperature is reached, and monitor the cell pressure while heating and bleed off pressure if necessary by opening the pressure relived valve on the side of the hydraulic hand pump;

18. Once the test sample has reached the testing temperature, pump the hydraulic hand pump until the pump gauge shows the testing pressure plus the required back pressure;

19. Apply the required back pressure to the top of the cell, open the top valve, and pump the hydraulic hand pump to reestablish the testing pressure;

20. To determine the spurt volume, collect the fluid from the back pressure collector in a measuring cylinder and record the amount, ensuring that all the fluid has been expelled;

21. Collect the fluid periodically over a 30 minute time period and check the back pressure gauge to ensure that the testing pressure remains below the pressure threshold (about 3000 psi) of the built-in safety disc of the Permeability Plugging Tester apparatus and avoid expulsion of hot hydraulic oil;

22. Record the spurt loss, total leak off, and PPT values over the 30 minute time period.

Table 2 shows the results of the plugging efficiency tests for the two-component LCM with the spurt loss, fluid loss, total leak off, and PPT value measured in cubic centimeters (cc):

TABLE 2

Plugging Efficiency Test Results for Two-Component LCM

| Test No. | Slot size (mm) | Test Temperature (° F.) | Test Pressure (psi) | Spurt Loss (cc) | Fluid Loss (cc) | PPT Value (cc) |
|---|---|---|---|---|---|---|
| 1 | 2 | Room Temperature | 1500 | 0 | 0 | 0 |
| 2 | 2 | 250 | 1500 | 0 | 0 | 0 |

Figure 6:
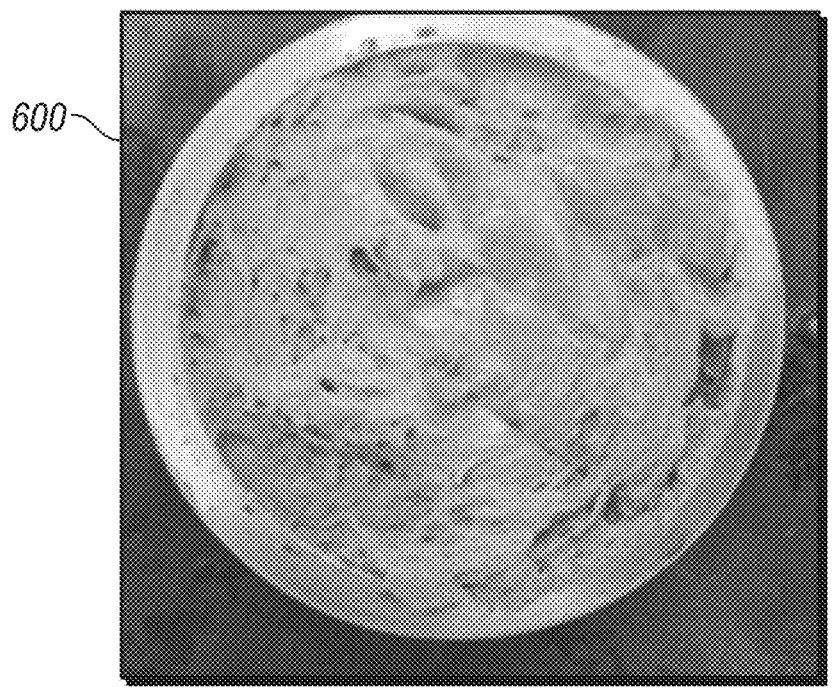
FIG. 6 is a photograph of a 2 millimeter slotted disc used in a Permeability Plugging Tester apparatus for a plugging efficiency test in accordance with an example embodiment of the disclosure.

As shown in Table 2, the in-situ generated two-component LCM exhibited zero spurt loss and zero fluid loss for the entire test period. Additionally, observation of the 2 mm slotted disc showed that gel-like materials had filled and sealed the 2 mm slots of the disc that are analogous to natural or induced fractures in a loss zone. FIG. 6 is a photograph 600 of the 2 mm slotted disc used in the PPT apparatus for the plugging efficiency test. FIG. 6 illustrates the 2 mm slots in the slotted disc sealed by the two-component LCM after a plugging efficiency test of the two-component LCM. The results of the plugging efficiency test shown in Table 2 and depicted in FIG. 6 further demonstrate the suitably of the two-component LCM for controlling losses in a moderate-type and other types of lost circulation.

Two-Component LCM Manufacture and Use

In some embodiments, a two-component LCM may include a polymer component having a polymer and a sodium hydroxide component. In some embodiments, the polymer includes an acrylic polymer solution. In some embodiments, the acrylic polymer solution is a 30% acrylic polymer solution. In some embodiments, the acrylic polymer is obtained from Dow Chemical of Midland, Mich., USA. As will be appreciated, the acrylic polymer may be stable towards water but, when converted to acrylate, may absorb large amounts of water and swell much larger than its original size.

In some embodiments, the polymer component includes a carrier fluid, a particulate material, a fibrous material, a 30% acrylic polymer solution. In some embodiments, the polymer component of the two-component LCM includes the water as the carrier fluid, fly ash as the particulate material, polypropylene fibers as the fibrous material, and an acrylic polymer (which, in some embodiments, may be a 30% acrylic polymer solution). In some embodiments, the carrier fluid may include freshwater (water having relatively low (that is, less than 5000 ppm) concentrations of total dissolved solids), or seawater (for example, water having a salinity in the range of about 33,000 to about 37,000 parts-per-million (ppm)). In some embodiments, the carrier fluid may include artificial brines, natural brines, brackish water, or formation water.

In some embodiments, the fly ash may be obtained from coal combustion and may include silicon dioxide, aluminum oxide, and calcium oxide. In some embodiments, the fly ash is obtained from Ashtech International (FZE) of Dubai, United Arab Emirates. As will be appreciated, the fly ash is a gray powder with pozzolanic properties and, in some embodiments, may have a specific gravity in the range of about 2 to about 2.9 and a solubility in water of less than about 5%.

In some embodiments, the polypropylene may be a polypropylene homopolymer. In some embodiments, the polypropylene may be obtained from Belgian Fibers Manufacturing SA of Mouscron, Belgium. As will be appreciated, the polypropylene is a thermoplastic polymer lighter than water and having resistance to acids and alkalis. In some embodiments, the polypropylene may be fibers having a flash ignition of about 255° C., a melting point greater than about 165° C., and a specific gravity of about 0.91.

In some embodiments, the polymer component of the two-component LCM includes fly ash in the range of about 200 g to about 400 g, polypropylene fibers in the range of about 2 g to about 6 g, and a 30% acrylic polymer solution in the range of about 20 ml to about 40 ml. In some embodiments, the polymer component includes at least 200 ml of water, at least 300 g of fly ash, at least 4 g of polypropylene, and at least 40 ml of a 30% acrylic polymer solution. In some embodiments, the polymer component may include 36.6 w/w % water, 55 w/w % fly ash, 0.7 w/w % polypropylene, and 7.7 w/w % acrylic polymer solution. In some embodiments, the sodium hydroxide component includes sodium hydroxide and water. In some embodiments, the sodium hydroxide component includes 6 ml of water and 1.5 g of sodium hydroxide. In some embodiments, the sodium hydroxide component is at least 20 w/w % sodium hydroxide. In some embodiments, the sodium hydroxide component may include 80 w/w % water and 20 w/w % sodium hydroxide. In some embodiments, the sodium hydroxide component may include at least 25 w/w % sodium hydroxide. In some embodiments, the pH of a two-component LCM may be increased to form a plug having a greater strength.

In some embodiments, a method of delivering the two-component LCM to a lost circulation zone may include placing the polymer component in the lost circulation zone and subsequently placing the sodium hydroxide component in the lost circulation zone after placement of the polymer component. The placement of the sodium hydroxide component may initiate reaction between the polymer component and the sodium hydroxide component to form the two-component LCM. Introducing the polymer component and sodium hydroxide component to the lost circulation zone in this manner improves ease of delivery to the lost circulation zone and avoids formation of a plug at the surface that may be difficult to place in the lost circulation zone via pumping or other techniques.

In some embodiments, the two-component LCM may be formed by introducing (for example, via pumping) the polymer component downhole, such as in a fluid pill, followed by introducing (for example, via pumping) the sodium hydroxide component downhole that that the sodium hydroxide component comes into contact with the polymer component and forms the two-component LCM. In some embodiments, the polymer component may be added directly to a drilling fluid, such as a drilling mud, to create an altered drilling fluid having the polymer component of the two-component LCM. For example, in some embodiments, the polymer component may be added to (for example, blended with) an oil-based drilling mud or a water-based drilling mud. In some embodiments, the polymer component of the two-component LCM may be added at the mud pit of a mud system. After addition of the polymer component of the two-component LCM to a drilling fluid, the altered drilling fluid may be circulated at a pump rate effective to position the altered drilling fluid into contact with a lost circulation zone in a wellbore. After introduction of the polymer component of the two-component LCM, the sodium hydroxide component may be introduced to the polymer component via coil tubing. As the sodium hydroxide component comes into contact with the polymer component, the two-component LCM is formed and alters the lost circulation zone (for example, by entering and blocking porous and permeable paths, cracks, and fractures in a formation in the lost circulation zone, such as forming a plug in a fracture).

Figure 7:
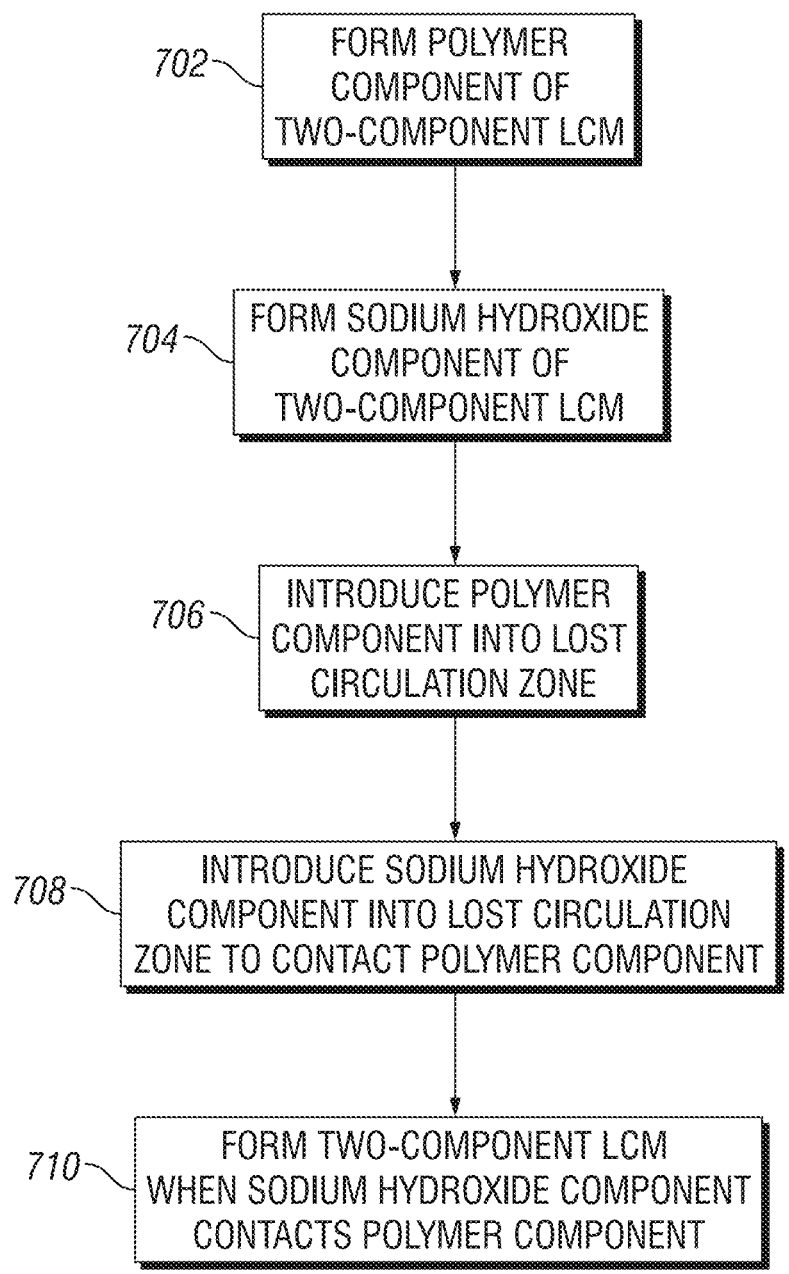
FIG. 7 is a block diagram of a process for manufacturing and using a two-component LCM in accordance with an example embodiment of the disclosure.

FIG. 7 depicts a process 700 for manufacturing and using a two-component LCM having a polymer component and a sodium hydroxide component in accordance with an example embodiment of the disclosure. In some embodiments, the polymer component may be formed (block 702) by mixing a carried fluid (for example water), a particulate material (for example, fly ash), a fibrous material (for example, polypropylene), and an acrylic polymer (such as a 30% acrylic polymer solution) in a mixer for a time period. In some embodiments, the sodium hydroxide component may be formed (block 704) by mixing sodium hydroxide and water in a mixer for a time period.

Next, in some embodiments the polymer component may be introduced into a lost circulation zone (block 706). For example, in some embodiments the polymer component may be added to drilling fluid and pumped downhole in the altered drilling fluid. Next, the sodium hydroxide component may be introduced into the lost circulation zone to contact the polymer component (block 708). For example, the sodium hydroxide component may be introduced by coiled tubing (also referred to as a "coiled tubing string"). As the sodium hydroxide component comes into contact with the polymer component, the two-component LCM is formed (block 710). In some embodiments, for example, the two-component LCM may be formed or described as forming a pill.

In other embodiments, the two-component LCM and one or more additional LCMs may be added to a drilling fluid, such as a drilling mud, to create an altered drilling fluid having the LCMs. For example, in some embodiments, the polymer component of the two-component LCM and one or more additional LCMs may be added to an oil-based drilling mud or a water-based drilling mud.

Ranges may be expressed in the disclosure as from about one particular value, to about another particular value, or both. When such a range is expressed, it is to be understood that another embodiment is from the one particular value, to the other particular value, or both, along with all combinations within said range Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A method to control lost circulation in a lost circulation zone in a wellbore, comprising:
    introducing a first component into the wellbore such that the first component contacts the lost circulation zone, wherein the first component comprises:
        a carrier fluid;
        fly ash;
        polypropylene fibers; and
        an acrylic polymer solution comprising an acrylic polymer and water;
    introducing, after introducing the first component, a second component into the wellbore, such that the second component contacts first component in the lost circulation zone, wherein the second component comprises sodium hydroxide and water.

2. The method of claim 1, wherein introducing the first component into the wellbore such that the first component contacts the lost circulation zone comprises introducing an altered drilling fluid having the first component into the wellbore, such that the altered drilling fluid contacts the lost circulation zone.

3. The method of claim 1, wherein introducing the second component into the wellbore such that the second component contacts the first component in the lost circulation zone comprises:
    inserted coiled tubing into the wellbore; and
    introducing the second component via coiled tubing via the wellbore.

4. The method of claim 1, wherein introducing the second component into the wellbore such that the second component contacts the first component in the lost circulation zone comprises forming a lost circulation material (LCM) from a reaction of the first component with the second component.

5. The method of claim 1, wherein the carrier fluid of the first component comprises water.

6. The method of claim 1, wherein the LCM composition consists of the first component and the second component.

7. The method of claim 1, wherein the first component consists of:
   the carrier fluid;
   fly ash;
   polypropylene fibers; and
   the acrylic polymer.

8. The method of claim 1, wherein the second component consists of sodium hydroxide and water.

9. The method of claim 1, wherein the second component comprises 25% by weight of the sodium hydroxide.

10. The method of claim 1, wherein the fly ash comprises an amount in the range of 200 grams to 400 grams.

11. The method of claim 1, wherein the polypropylene comprises an amount in the range of 2 grams to 6 grams.

12. The method of claim 1, wherein the acrylic polymer solution comprises at least 30% by weight acrylic polymer.

13. The method of claim 12, wherein the acrylic polymer solution of the first component comprises an amount in the range of 20 milliliters to 40 milliliters.

\* \* \* \* \*